United States Patent [19]

Thomas et al.

[11] 3,997,282

[45] Dec. 14, 1976

[54] PUMP PRESSURE CONTROL DEVICE

[75] Inventors: David F. Thomas, West St. Paul; David J. Anderson, Maple Grove, both of Minn.

[73] Assignee: Waterous Company, South St. Paul, Minn.

[22] Filed: Oct. 9, 1975

[21] Appl. No.: 621,246

Related U.S. Application Data

[63] Continuation of Ser. No. 341,694, March 15, 1973, abandoned.

[52] U.S. Cl. .............................................. 417/34
[51] Int. Cl.² ...................................... F04B 49/00
[58] Field of Search ............ 417/34, 18, 36; 60/418

[56] References Cited

UNITED STATES PATENTS

| 1,566,376 | 12/1925 | County ............................ 123/103 |
| 2,642,805 | 6/1953 | Nepper ............................ 417/34 |
| 2,982,260 | 5/1961 | Hunter ............................ 417/18 |
| 3,116,694 | 1/1964 | Eberhardt ........................ 417/34 |

FOREIGN PATENTS OR APPLICATIONS

| 1,151,773 | 5/1969 | United Kingdom ................ 60/418 |
| 138,818 | 10/1960 | U.S.S.R. ............................ 417/36 |

*Primary Examiner*—William L. Freeh
*Attorney, Agent, or Firm*—Burd, Braddock & Bartz

[57] ABSTRACT

A pump pressure control device includes a slidably mounted throttle control cylinder having a piston connected to a pump engine throttle to vary the speed of the engine. One side of the piston in the throttle control cylinder is open to pressure from an accumulator having a diaphragm or bladder therein. The accumulator, on the side of the bladder opposite the side open to the control cylinder, is precharged to a desired pressure. The other side of the control cylinder piston is open to the pressure in the pump output line which it is desired to regulate. The regulated pump discharge pressure is adjusted by sliding the control cylinder with respect to a fixed base. A directional flow valve functions to reverse the connections to the throttle control cylinder when the discharge pressure drops below a predetermined minimum.

5 Claims, 6 Drawing Figures

PUMP PRESSURE CONTROL DEVICE

This is a continuation of application Ser. No. 341,694, filed Mar. 15, 1973 now abandoned.

This invention relates to an improvement in a pump pressure control device, and deals particularly with an apparatus designed to maintain pump discharge pressure at an adjustable, predetermined relatively constant level.

BACKGROUND OF THE INVENTION:

Fire pumps are normally driven by engines of the internal combustion type. If the throttle controlling the engine driving the pump remains at one setting, the pump discharge pressure fluctuates with the load imposed on the engine by the pump. With a number of hose lines connected to the pump, if one hose line is closed thus reducing the load, the pressure in the remaining hose line increases, creating a definite hazard to those handling the remaining lines. Similarly, when an added hose line is turned on, the remaining hose lines experience a drop of pressure complicating the control thereof. Thus, particularly in combination with fire pumps, it is very important to maintain as nearly constant a discharge pressure as is possible.

Devices have been designed to attempt to maintain a relatively constant discharge pressure by controlling the speed of the engine driving the pump. See, for example, U.S. Pat. No. 2,642,805 to Richard Curt Nepper, granted June 23, 1953; U.S. Pat. No. 3,116,694 to Harry A. Eberhardt, granted Jan. 7, 1964; and U.S. Pat. No. 3,544,235 to Edson W. Smith, granted Dec. 1, 1970.

Attempts have been made to control the discharge pressure of fire pumps through the use of a piston and cylinder arrangement in which the piston is connected to the engine throttle or speed control device. One side of the piston in the cylinder is subjected to pump discharge pressure. The end of the cylinder on the other side of the piston is subjected to a predetermined reference pressure. When the pump discharge pressure increases, the piston moves toward the end of the cylinder subjected to the reference pressure, the piston rod moving the engine throttle toward engine idling speed, or reducing the speed of the engine to correspondingly reduce the discharge pressure. If the discharge pressure of the pump decreases, due to the opening of additional hose lines or for any other reason, the reference pressure exceeds the discharge pressure, and moves the piston and piston rod to open the throttle to increase the speed of the engine. See the patent to Smith, U.S. Pat. No. 3,544,235.

In the Smith device, and in other devices, the reference pressure is maintained through the use of an accumulator containing air which is compressed by water to the extent necessary to equal the desired discharge pressure of the pump. Thus the pressure on opposite sides of the piston is normally equal. In view of the fact that the reference pressure remains substantially constant, the movement of the piston either in one direction or the other is controlled by variations in the pump discharge pressure.

The controls which have been previously produced include structures in which the cylinder is held in fixed position, and the piston may move relative to the cylinder to provide the control. See all three of the aforementioned patents. Where the piston sticks in one position, the throttle cannot be opened or closed until the piston is broken loose. This presents a dangerous and very unsatisfactory situation where the apparatus is being used to supply water under pressure during a fire. Such a condition is difficult to override or correct through the use of manual controls, and if shock on the control cylinder does not loosen the piston, shutdown of the equipment, and consequent loss of pressure in the hose lines, may be necessary.

SUMMARY OF THE INVENTION

It is an object of the present invention to provide a device for the same general purpose as the previous devices, but to avoid the difficulties which have been experienced with them. For example, the accumulator includes a bladder or diaphragm forming a separate compartment within the accumulator. This bladder may be precharged with air or other gas such as nitrogen which may be, for example, at a pressure of 5 atmospheres. This has several advantages over previous accumulators where air originally at atmospheric pressure is actually compressed by the liquid.

In the first place, the air cannot be entrained in the water, and cannot escape, because the air and water are separated by the bladder of rubber or similar suitable material. Secondly, at any given pre-charge air pressure level above atmospheric, the free volume of air within the bladder is much larger than if the accumulator were originally filled with air at atmospheric pressure and then compressed.

For example, if an accumulator tank of the prior art had a capacity of one gallon (231 cubic inches), the volume of free air at the atmospheric pressure in the accumulator at the start of the operation would be 231 cubic inches. By pre-charging the accumulator on one side of the bladder of the present device to 75 pounds per square inch absolute (approximatley 90 pounds per square inch gauge) or five atmospheres, the volume of free air will be 5 × 231 or 1155 cubic inches. If the pressure in the accumulators of the prior art was increased by increasing the water pressure against it due to the action of the discharge pressure from the pump to present a pressure inside of the accumulator of 240 pounds per square inch absolute, or 16 atmospheres, the volume of air would be reduced to 1/16 × 231, or 14.4 cubic inches. With the structure of this invention, the volume of air in the accumulator under a pump discharge pressure of 240 pounds per square inch absolute, the volume of air in the accumulator will be reduced only to 5/16 × 231, or 72.2 cubic inches.

Assuming that the throttle must be moved in order to control the pressure due to a change in pump operating condition, and that the piston movement needed requires a volume of two cubic inches of water, in the prior art device of the above example, the change in pressure needed would be 2/14.4 × 240 or 33.3 pounds per square inch. In the device of the invention, however, the change in pressure necessary would be only 2/72.2 ×240 or about 6.6 pounds per square inch (psi). The foregoing figures are based on a 15 psi atmospheric pressure, and of course at lower pressures which would exist at high altitudes or when a pump was operated at draft so that the air pressure inside the pump at start-up would be sub-atmospheric, the difference would be even more pronounced.

A further feature of the present invention resides in the provision of a pressure control device including a directional control valve which functions automatically to close the throttle to idling position in the event that the pump discharge pressure decreases below a predetermined value. This will prevent damage to the pump should the source of water to the pump be cut off or should the pump discharge pressure drop to an ineffective value for any other reason. In such a circumstance, the speed of the engine is no longer tied to the discharge pressure, and the engine effectively terminates its efforts to keep the pump at the predetermined pressure.

This directional control valve includes a slidable valve element which is movable between two extreme positions. In one extreme position, the discharge of the pump is connected to one end of the throttle operating cylinder and piston device, and the accumulator is connected to the opposite end thereof, so that the accumulator pressure tends to urge the piston in the throttle closing direction. When the discharge pressure exceeds a certain minimum, the valve element in the directional valve is moved into the other extreme position in which the discharge pressure tends to urge the piston in the throttle closing direction and the accumulator pressure tends to urge the piston in the throttle opening direction. As soon as the discharge pressure decreases below this predetermined minimum again, the valve element returns to its first extreme position, thus allowing the accumulator pressure to close down the throttle to idling position.

A further feature of the present invention resides in the provision of a structure in which the throttle control cylinder can be moved manually with respect to its mounting base, thus to cause the piston in that cylinder to move the throttle toward open or closed condition. This cylinder movement allows the predetermined pump discharge pressure to be varied at will. Also, if the piston should become stuck in a particular position within the throttle control cylinder, the throttle may be manually controlled by movement of the cylinder and piston in unison with respect to the mounting base of the cylinder.

A feature of the present invention resides in the provision of a means of placing the device into or out of operation. The accumulator is controlled by the directional control valve. A by-pass is provided between the lines connected to opposite ends of the throttle control cylinder. This by-pass includes a shutoff valve. One or the other of these lines to the throttle control cylinder is at all times open to the pump discharge through the directional valve. When the shut-off valve is in open position, the pump discharge pressure communicates with the accumulator to pressurize the same. When the shut-off valve is in closed position, the accumulator is isolated from the pump discharge pressure, and is connected to one end only of the throttle control cylinder. The other end of the throttle control cylinder is connected to the pump discharge pressure so that the pump discharge pressure acts upon the piston in opposed relation to the accumulator pressure.

These and other objects and novel features of the present invention will be more clearly and fully set forth in the following specification and claims.

IN THE DRAWINGS

Figure 1:
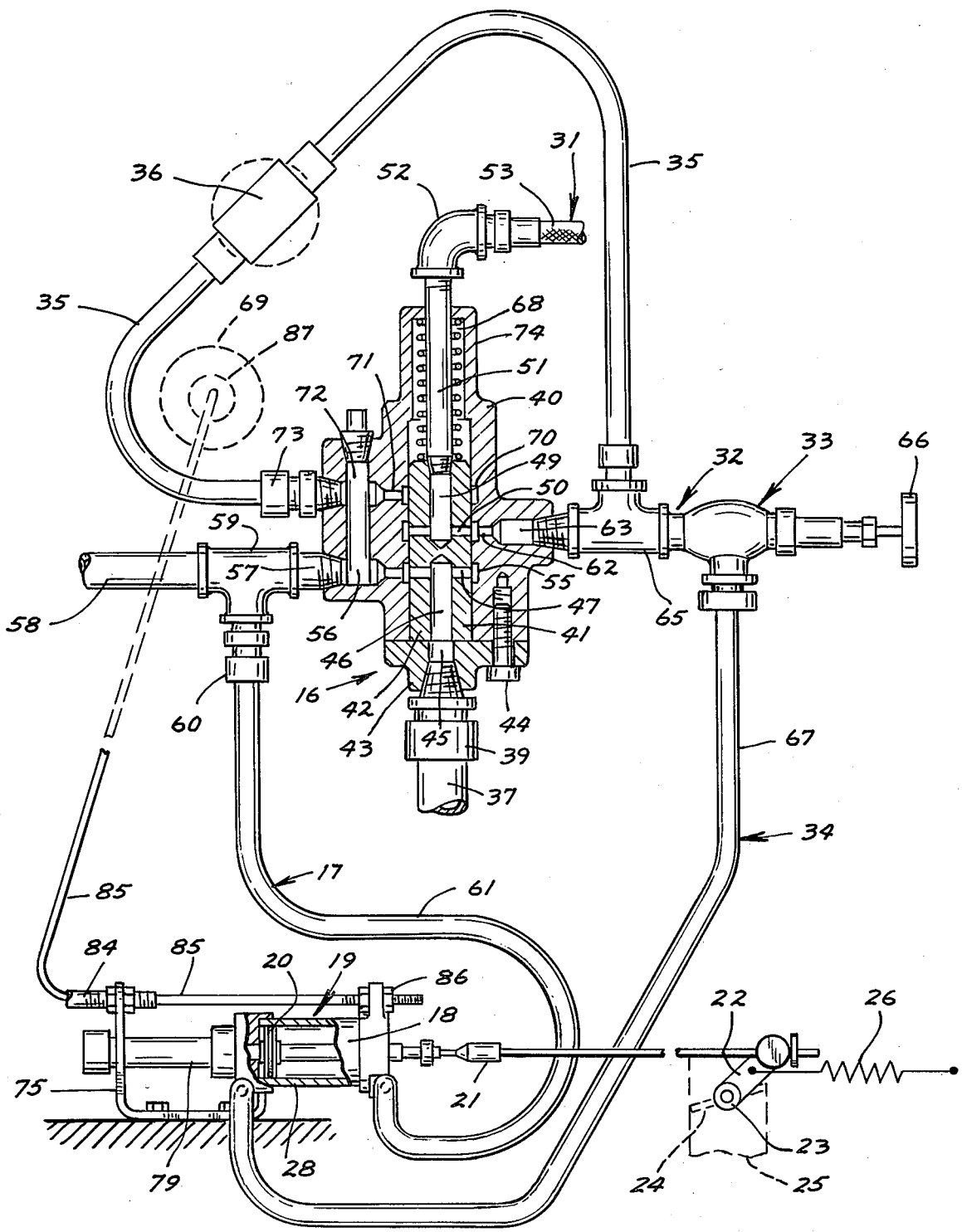
FIG. 1 is a diagrammatic view of the system, including a sectional view through a directional control valve indicating diagrammatically the connections between this valve and a throttle control cylinder, a portion of this cylinder being broken away to indicate the position of the piston.
Figure 2:
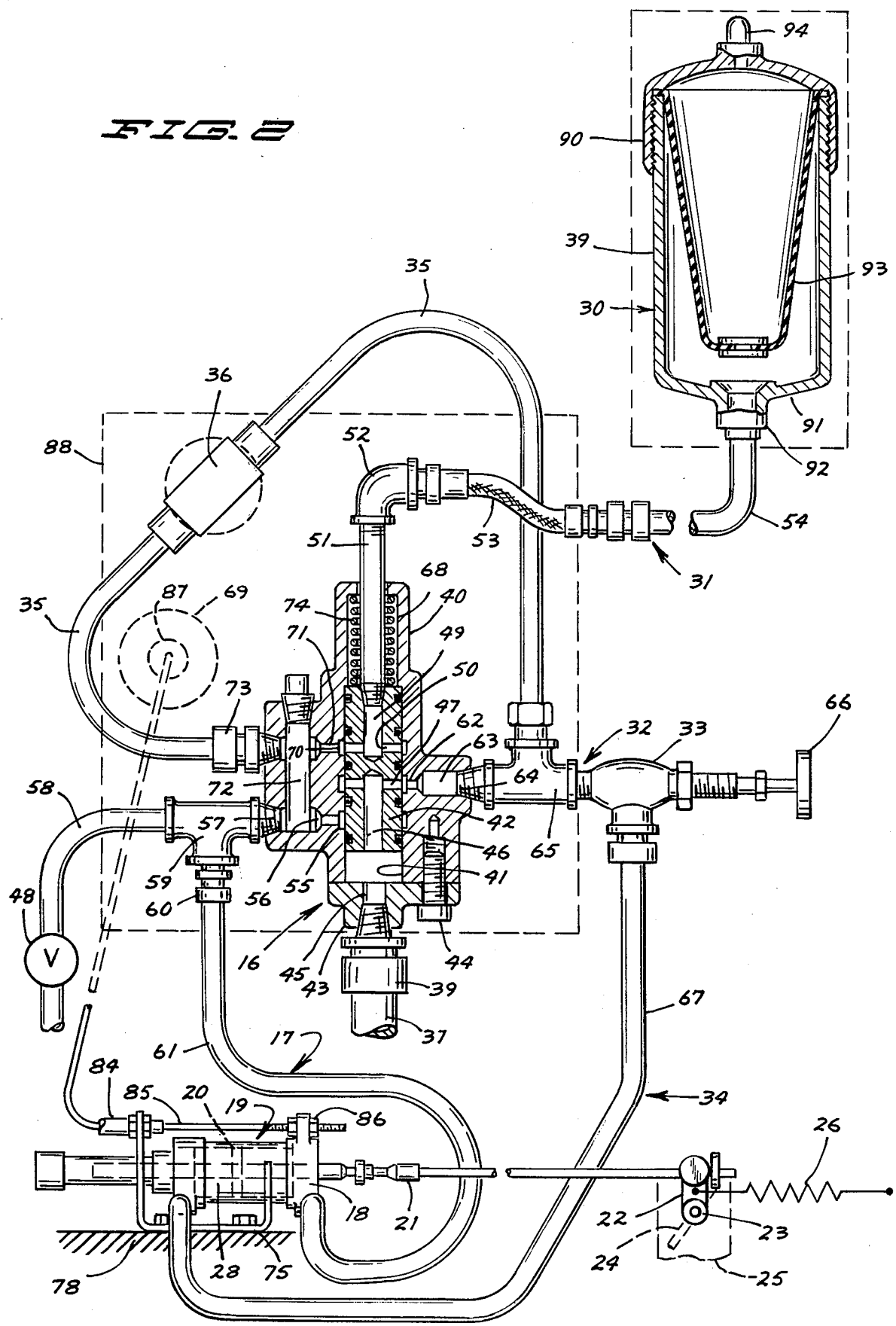
FIG. 2 is a view similar to that of FIG. 1 but showing the directional control valve in automatic control operating positions, this figure also indicating the accumulator in section.
Figure 3:
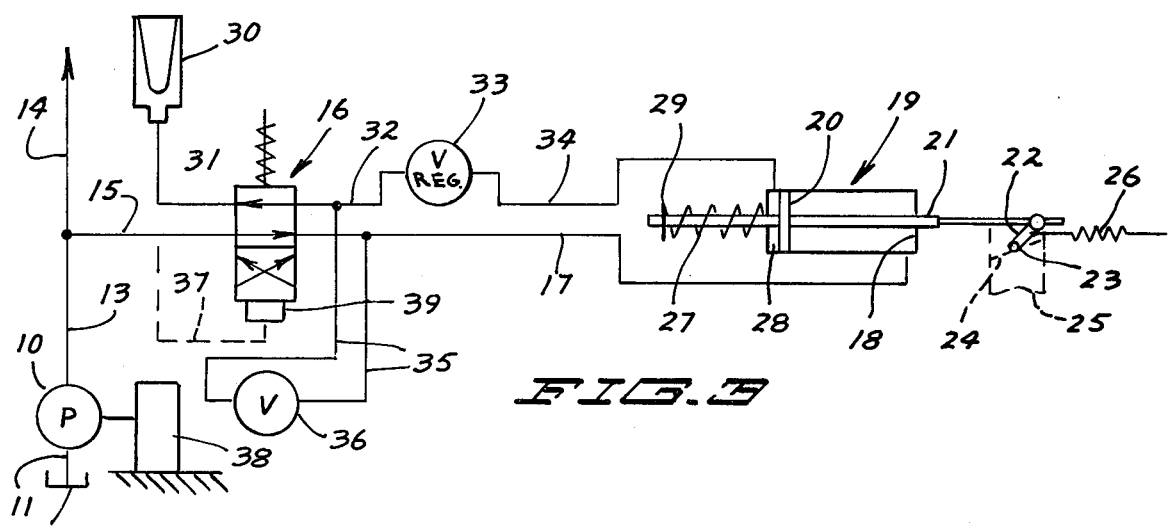
FIG. 3 is a flow diagram showing the position of the directional control valve and throttle operating cylinder as the pump starts in operation.
Figure 4:
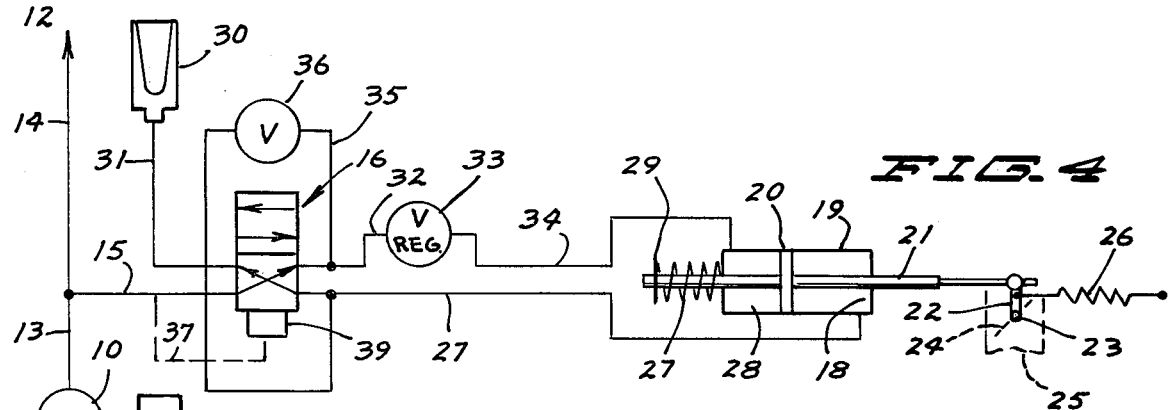
FIG. 4 is a view similar to that of FIG. 3, but showing the position of the directional control valve and the throttle control cylinder when the pump is in operation, the pump discharge pressure is appreciable, and the throttle is being automatically controlled.

DESCRIPTION OF THE PREFERRED EMBODIMENT:

As indicated diagrammatically in FIGS. 3 and 4, the elements of one preferred form of the pump pressure control device of the invention and the apparatus associated with it include a fire engine pump 10 connected by an intake or suction line 11 to a water supply 12. The discharge from pump 10 is delivered through a delivery discharge pressure line 13 to an outlet manifold 14, to which may be connected a series of hose lines or the like, not shown. Discharge pressure line 13 is connected through a suitable discharge pressure conduit 15 to a directional control valve 16 which has a valve element or valve spool 42 movable from a first position as seen in FIG. 1 and as diagrammatically indicated in FIG. 3 to allow straight through flow through the control valve to a second position as seen in FIG. 2 and as diagrammatically indicated in FIG. 4 to provide for reverse flow through the directional control valve 16.

The directional control valve 16 is connected by a conduit 17 to a throttle control cylinder 19, the conduit 17 extending to a first end 18 of the throttle control cylinder 19 on a first side of a throttle control piston 20. The throttle control piston 20 is operably mounted inside of cylinder 19 and is provided with a piston rod 21 extending through both of the end walls or closure plates of the body of throttle control cylinder 19. This piston rod 21 is connected at one end to a suitable engine control means. In the present case, this control means is shown as a throttle arm 22 which is fixedly mounted on a pivot rod 23. This pivot rod 23 also supports a butterfly throttle valve diagrammatically indicated at 24 in an intake manifold 25. This intake manifold 25 and butterfly valve 24 can be of any usual or preferred construction, forming a part of a fire engine or prime mover 38 which is illustrated diagrammatically in FIGS. 3 and 4. Opening of butterfly valve 24 causes engine 38 to deliver more power, while closing that butterfly valve causes the engine to deliver less power to fire engine water pump 10.

Obviously, the piston rod 21 may be coupled to many other means for controlling the speed of the engine 38 within the spirit of the invention and the scope of the claims which follow. However, for the purpose of this description, the arm 22 and valve 24 are defined merely as a throttle.

As shown, throttle arm 22 is biased to tend to move the butterfly throttle valve 24 toward a closed or idle position through the instrumentality of a relatively weak tension spring 26. This movement is opposed by a relatively strong compression spring 27 which is situated between a second or spring end 28 of the throttle control cylinder 19 and a shoulder or end washer 29 fixedly mounted on piston rod 21.

The relative strengths of the springs 26 and 27 are illustrated diagrammatically in FIGS. 3 and 4, and are such that without any pressures being exerted on the piston 20 in throttle control cylinder 19, the spring 27 will easily control movement of the piston rod 21 and will carry the butterfly throttle valve 24 through movement of the throttle arm 22 to its open position against the action of spring 26.

An accumulator 30 is connected through a line 31 to the directional control valve 16. A line 32 extends from directional control valve 16 to a regulator valve or needle valve 33 and a line 34 extends from that regulator valve 33 to the second or spring end 28 of the throttle control cylinder 19. A by-pass line 35 extends between line 32 and conduit 17 and has a shutoff valve 36 in it. This allows line 35 to by-pass the direction control cylinder 16 when the shutoff valve 36 is open during start-up. A pressure control line 37 is indicated in dotted lines and connects from the discharge pressure conduit 15 to the directional control valve 16 through a filter or strainer 39. As will later become evident, all of the fluid from the pressure line 15 actually enters the body of the directional control valve 16 through this filter 39. Particularly with reference to FIGS. 1 and 2, the directional control valve 16 includes a valve body 40 having a cylindrical bore 41 therein which is designed to slidably accomodate the valve element or valve spool 42. A bottom closure plate 43 encloses the lower end of the bore 41 and is held in place by suitable cap screws 44. It is to be understood that the valve 16 will function regardless of the position of the parts, and that the terms "bottom" and "top" are merely for the purposes of simplifying the description.

An inlet passage 45 extends through the closure plate 43, and leads to the bore 41 from pressure control line 37 and filter 39. This communicates the pump discharge pressure to the interior of the bore 41.

A lower end of valve spool 42 is provided with a lower axial bore or passage 46 extending from the bottom end thereof into communication with a provided cross hole 47, thus providing a passage through which fluid pressure introduced at inlet passage 46 can pass. An upper end of the valve spool 42 is provided with an upper axial bore 49 which is open from the top thereof and terminates short of the bore 46 but which communicates with a provided cross hole 50. A pipe 51 is threaded into the upper end of axial bore 49 of spool 42. An elbow 52 connects an upper end of pipe 51 with a flexible hose 53 which leads to a lower portion of accumulator 30 through a conduit 54. This pipe, hose and conduit form the line 31 as diagrammatically indicated in FIGS. 3 and 4.

The valve body 40 of directional control valve 16 includes a lower ring-shaped groove 55 encircling valve spool 42. This groove 55 is open through a provided passage 56 in the body 40 to a nipple 57 and a tee connection 59. This tee connection 59 is connected through a suitable fitting 60 to a hose 61 which forms the conduit 17 and is open to a first end 18 of the throttle control cylinder 19 as previously described. The third port of the tee connection 59 is open to a drain passage 58 through a suitable normally closed cutoff valve 48 to permit selectively opening and closing the drain passage.

Valve body 40 of directional control valve 16 is provided with an intermediate ring-shaped groove 62 which also encircles valve spool 42 and which communicates through a passage 63 provided in the valve body 40 to a nipple 64 and a tee connection 65. The opposite end of tee connection 65 is connected to the regulator or needle valve 33 which is controlled by a suitable manual control knob 66. Needle valve 33 is connected through a hose 67 to a port at the spring or second end 28 of the throttle control cylinder 19. This hose 67 and its fittings comprise the line 34 described in conjunction with FIGS. 3 and 4.

An upper ring-shaped groove 70 is also provided in the valve body 40, and this groove also encircles the valve spool 42. It communicates through a passage 71 provided in the valve body 40 with a valve chamber 72 which is also open to the passageway 56. This valve chamber 72 is connected through a suitable fitting 73 to one end of by-pass line 35, the other end of this by-pass line communicating with an upper port of tee connection 65.

A compression coil spring 74, as shown, is situated in a provided upper spring chamber 68 in valve body 40, and bears against the upper end of that chamber and an upper end of valve spool 42 to urge spool 42 toward the lower end of the valve body. spring 74 is of a proper compressive strength to resist upward movement of valve spool 42 in the valve body 40 until a predetermined minimum pump discharge pressure is attained and is delivered through inlet passage 45 to the valve body 40. For example, in a typical working situation, a pressure equal to or in excess of 50 psi beneath valve spool 42 may be required in order to overcome the force of spring 74 and to thereby achieve upward movement of valve spool 42.

While compression coil spring 74 is shown to offer a fixed compressive force on valve spool 42 in accordance with the physical properties of that spring, it is to be understood that suitable fixtures and threaded caps could be provided at the upper end of the fitting 40 and in surrounding, clearing relation to pipe 51 which would allow the compressive force exerted by spring 74 to be varied, thus to vary the predetermined minimum pump discharge pressure at which valve spool 42 will move.

Figure 5:
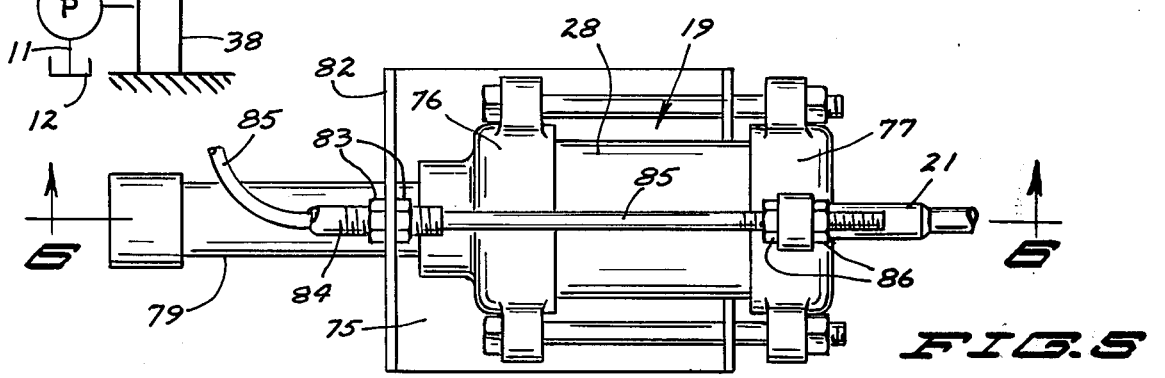
FIG. 5 is a top plan view of the throttle control cylinder of FIGS. 1 and 2.
Figure 6:
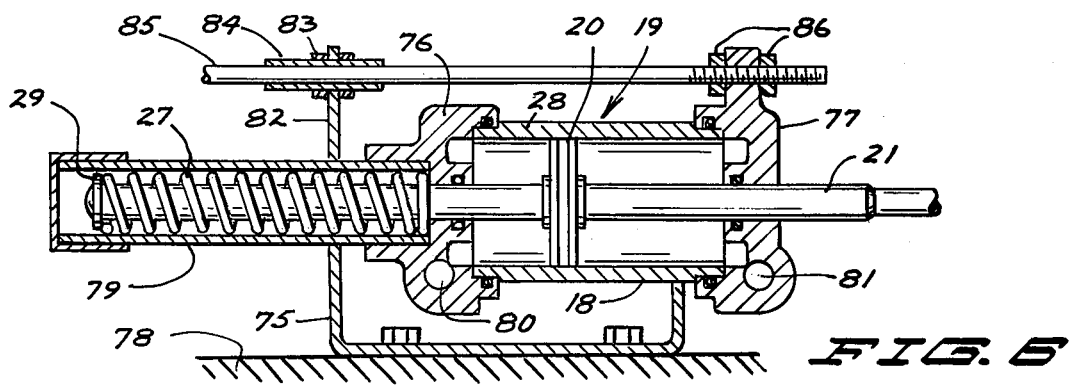
FIG. 6 is a sectional view through the throttle control cylinder, taken on the line 6—6 in FIG. 5.

Referring particularly to FIGS. 5 and 6, the throttle control cylinder 19 is slidably supported on a generally U-shaped bracket 75, the bracket 75 being fixedly mounted on any convenient location, such, for example, as a portion of a fire engine frame 78. The first end 18 of the throttle control cylinder 19 is provided with an end closure plate 77, while the second end 28 of that cylinder 19 is provided with an end closure plate 76. As previously indicated, the piston rod 21 of the piston 20 extends through these end closure plates 76 and 77. As shown, relatively strong compression spring 27 is preferably enclosed within a tubular enclosure 79 which extends outwardly from closure plate 76. Some other means of biasing, such as an adjustable tension spring operative on rod 21 and closure plate 76 could be used.

A port 80 is provided in closure plate 76 to provide a passage from the second end 28 of throttle control valve 19 to the hose 67 which comprises the major portion of line 34 leading from the regulator valve 33. A port 81 is provided in end closure plate 77 and is open from the first end 18 of the throttle control cylinder 19 to the hose 61 forming a part of conduit 17. An arm 82 of the fixedly mounted bracket 75 is provided with a clamp 83 which anchors a first end of a tubular conduit 84. This conduit 84 encloses a throttle control cylinder positioning rod or cable 85. This cable 85 is anchored to the end closure plate 77 of the throttle control cylinder 19 as indicated at 86. A second end of tubular conduit 84 is anchored as at 87 to a control panel which is indicated in dotted outline at 88 in FIG. 2. The control panel 88 may be situated as part of the dashboard of a fire truck, or may be at any other suitable location where other controls for the operation of the fire engine water pump 10 and its prime mover are grouped. An operating knob 69 is integrally mounted on an end of control cable 85 extending outwardly through the second end of flexible conduit 84 at the control panel 88. By moving this operating knob 69 with respect to the second anchored end of the tubular conduit 84, the throttle control cable 85 is slid through the conduit 84 to the end that throttle control cylinder 19 is moved axially with respect to the fixed bracket 75. When pressure inside of throttle control cylinder 19 is equalized on both sides of throttle control piston 20, or when there is no pressure in the cylinder, movement of cylinder 19 will cause simultaneous movement of the piston 20 and the piston rod 21.

With no pressure applied or with balanced pressure applied in cylinder 19, when cable 85 is moved in direction to the left as seen in FIGS. 5 and 6, as when operating knob 69 is pulled outwardly away from the control panel, the compressive strength of spring 27 is sufficient to overcome the force of relatively weaker tension spring 26, and piston rod 21 will move throttle arm 22 in direction to open the throttle.

When the operating knob 69 is moved closer to the control panel, throttle control cylinder cable 85 will move to the right as seen in FIGS. 5 and 6, moving the throttle control cylinder 19 in the same direction. This allows spring 26 to move throttle arm 22 in clockwise direction and piston rod 21 to the right as seen in FIGS. 1–4, thus causing the butterfly throttle valve 24 to move toward closed or idle condition.

As seen in FIG. 2, the accumulator 30 includes a substantially cylindrical body 89, a top 90 threadably mounted on the body 89, and a closed bottom 91 integral with the cylindrical body 89. A fitting 92 is integral with the closed bottom 91 and provides a passageway between conduit 54 and the interior of the accumulator, this conduit 54 being part of the line 31 as disclosed in FIGS. 3 and 4.

A resilient bladder or diaphragm 93 is sealed at its upper extremity to the accumulator body 89 and, as shown, is clamped in place between the accumulator top 90 and the top edge of the body 89. An air or inert gas valve intake member 94 is provided on the top of the cap 90, and acts in a manner of a tire valve to permit the interior of the upper portion of the accumulator inside of the bladder to be charged with air or other suitable gas, for example an inert gas, but to prevent the escape of such gas. In a typical installation, the accumulator on the top side of the diaphragm can be charged to a predetermined pressure such as, for example, 75 psi.

OPERATION

Description of the operation of the various elements of the invention will be begun with the parts in the position as seen in FIG. 1 and as diagrammatically illustrated in FIG. 3. Thus, the throttle control rod or cable 85 is fully extended in direction to the right as seen in FIG. 1, moving throttle control cylinder 19 to its extreme right hand position. In this position, the piston rod 21 is at its extreme right hand position, throttle arm 22 is in its extreme clockwise position, and through this arm, the spring 26 is holding the butterfly throttle valve 24 in its closed or engine idling position, even though piston 20 is at the extreme left hand end of the cylinder 19. Fire engine water pump 10 is primed and its prime mover 38 is activated to drive the pump to cause a flow in to delivery discharge pressure line 13 and, consequently, to build up pressure and flow through pressure control line 37, filter 39 and inlet passage 45 to the lower end of the cylindrical bore 41 of the valve body 40 of directional control valve 16. At this point, shut off valve 36 in line 35 is open so that fluid from the pump may flow through lower axial bore 46, and cross hole 47 in valve spool 42, through lower ring-shaped groove 55 and passage 56 of valve body 40 to tee connection 59 and from there through conduit 17 to the first end 18 of the throttle control cylinder 19. This pump discharge flow will also pass through the valve chamber 72 in valve body 40, and through by-pass line 35 to tee connection 65. From there the pressure resulting from pump discharge flow will pass through needle valve 33 and line 34 to the spring or second end 28 of the throttle control cylinder 19. At this stage, the pressure on both sides of the throttle control piston 20 inside of the throttle control cylinder 19 is the same, so the piston will remain stationary relative to the cylinder 19.

With valve spool 42 in the position as seen in FIG. 1, and with by-pass valve 36 and line 35 open, fluid discharged from the pump 10 will also flow through tee connections 65 into passage 63 and intermediate ring-shaped groove 62 in the valve body 40, through the cross hole 50 and the upper axial bore 49 in the valve spool 42, and into pipe 51 and line 31 to the interior of the accumulator body 89 on the bottom side of the diaphragm or bladder 93.

As the fire pump 10 continues to operate under the action of the fire engine or prime mover 38 and with the outlet manifold 14 blocked against the delivery of water from the pump 10 to a location for use, the pressure in the system continues to build up until a point is reached where the predetermined pressure at which the force of compression coil spring 74 (for example 50 psi) will be overcome. At this point, valve spool 42 will move upwardly from position as seen in FIG. 1 to position as seen in FIG. 2. In this position, the lower cross hole 47 is in alignment with intermediate ring-shaped groove 62 in the valve body 40 and the pump discharge can flow out through tee connection 65 and the by-pass line 35 and back into valve chamber 72, passage 71 and the upper ring-shaped groove 70 of valve body 40 of the directional control valve 16. From there the flow will continue through cross hole 50 and upper axial bore 49 of valve spool 42 thus continuing to supply pressure through line 31 to the lower portion of accumulator 30.

When the desired pressure is reached in the accumulator 30, and the accumulator pressure equals the discharge pressure, the system can be activated for automatic control by closing shut off valve 36 and moving the throttle control cylinder 19 fully to the left through the instrumentality of throttle control cylinder positioning cable 85 and its operating knob 69. This will cause the piston rod 21 to move the throttle arm 22 against the action of spring 26 to carry the butterfly throttle valve 24 toward its open position.

This closing of valve 36 isolates the interior of the accumulator body 89 from the second or spring end of the throttle control cylinder 19 and from the pump discharge pressure which is present in the valve 19 in the first end of the valve. When throttle valve 24 is being opened, the throttle control piston 20 is forced to move to the right as viewed in the drawings relative to the cylinder 19, due to the momentary increase in pressure when manually moving the cylinder to the left. The piston 20 will then come to rest at some intermediate point between the ends of the cylinder 19 when the cylinder is fully to the left and the control cable 85 is fully "open". At this equilibrium condition, the discharge pressure will equal the pressure in the accumulator 30. With no fire hose line connected through the manifold 14, the pump discharge pressure will continue to rise and this pressure will be applied through pressure control line 37, spool valve lower axial bore 46 and cross hole 47, out through intermediate ring-shaped groove 62 and passage 63 of the valve body 40 of direction control valve 16, and by way of regulator valve 33 and line 34 to the second end 28 of the throttle control cylinder 19. This higher pressure will force the throttle control piston 20 to the right. This movement of the piston 20 to the right causes a commensurate closing of the butterfly valve 24 through throttle arm 22, thus reducing the speed of the engine and limiting the increase of fire pump discharge pressure to a level equal to the pressure in the accumulator.

On the other hand, as discharge valves or fire hose lines are connected to the manifold 14 and the manifold is open to them, or as the fire pump pressure drops for any other reason, the pressure from the fire pump in the second end of the throttle control cylinder 19 will tend to drop below the accumulator pressure, and the higher accumulator pressure will cause piston 20 to move to the left relative to the throttle control cylinder 19, thus causing the butterfly throttle valve 24 to open until the increase in engine power and speed once more causes the discharge pressure from the pump to equalize the accumulator pressure.

If the fire pump runs out of water during operation, or for any other reason the discharge pressure at any time drops below a predetermined minimum value, say for example 50 psi, compression coil spring 74 in the directional control valve 16 will cause the valve spool 42 to move from the position as seen in FIG. 2 back to the position as seen in FIG. 1. In this position, the line 31 from the accumulator is connected through directional control valve 16 and regulator valve 33 through line 34 to the second end 28 of throttle control cylinder 19. By this same action, the discharge pressure from fire pump 10 is connected through line 37 and directional control valve 16 to line 17 and the first end 18 of the throttle control cylinder 19. The higher pressure in the accumulator will force the piston 20 to the right, thus moving the butterfly throttle valve 24 to its closed or idle position.

Once the situation which caused the fire pump pressure to drop below the predetermined minimum has been rectified, shut off valve 36 can again be opened to allow equalization of pressure on both sides of the piston 20 in the throttle control valve 19, and when the pressure in directional control valve 16 again increases above the predetermined minimum, the valve 36 can again be closed and the apparatus will resume automatic operation.

The embodiments of the invention in which an exclusive property or privilege is claimed are defined as follows:

1. In combination,
   a. a main frame;
   b. a pump fixedly mounted with respect to the frame and having a delivery discharge port and an intake port;
   c. means for driving the pump;
   d. a throttle for regulating the output of the pump;
   e. a hydraulic throttle control device including:
      1. a throttle control cylinder mounted for longitudinal movement with respect to said main frame, and having a first end closure plate closing a first end and a second end closure plate closing a second end of said cylinder;
      2. a throttle control piston operably mounted in said cylinder and dividing the cylinder into a first end chamber adjacent the first end closure plate and a second end chamber adjacent the second end closure plate;
      3. resilient means urging said piston in direction away from said first end and toward said second end of said cylinder; and
      4. a piston rod integral with said piston and extending outwardly of said cylinder through at least one end closure plate;
   f. an operational link between said piston rod and said throttle connected to decrease the output of said pump as said piston and piston rod move in direction toward said first end of said throttle control cylinder and to increase the output of said pump as said piston and rod move in direction toward said second end of the cylinder;
   g. an accumulator;
   h. means for charging gas into an upper portion of said accumulator;
   i. said means operable to define said first and second lower portion of said accumulator into said first end chamber;
   j. means operable to define a second passageway from said pump delivery port into said second end chamber; and
   k. independent means to selectively move said throttle control cylinder longitudinally to position it at any one of a plurality of positions with respect to said base;
   1. said means operable to define said first and second passageways including:
      1. a directional control valve having a valve element therein movable between first and second positions;
      2. said directional control valve, when said valve element is in said second position, defining parts of said first and second passageways;
      3. said directional control valve, when said valve element is in said first position, establishing a third passageway from a lower part of said accumulator into said second end chamber and establishing a fourth passageway from said delivery port into said first end chamber;
      4. means normally biasing said valve element toward said first position; and
      5. means responsive to the pump delivery pressure in said delivery port to move and hold said valve element to and in said second position when said pressure is above a predetermined minimum.

2. The combination of claim 1 wherein said accumulator includes a diaphragm separating and defining a first upper chamber into which said means for charging gas operates and a second lower chamber into which said first passageway opens.

3. The combination of claim 2; a by-pass line open between said first and said second end chambers of said throttle control cylinder; and a by-pass shut off valve in said by-pass line operative to selectively maintain said by-pass line open during start up and closed during automatic pressure control operation.

4. In combination,
  a. a main frame;
  b. a pump fixedly mounted with respect to the frame and having a delivery discharge port and an intake port;
  c. means for driving the pump;
  d. a throttle for regulating the output of the pump;
  e. a hydraulic throttle control device including:
      1. a throttle control cylinder mounted for longitudinal movement with respect to said main frame, and having a first end closure plate closing a first end and a second end closure plate closing a second end of said cylinder;
      2. a throttle control piston operably mounted in said cylinder and dividing the cylinder into a first end chamber adjacent the first end closure plate and a second end chamber adjacent the second end closure plate;
      3. resilient means urging said piston in direction away from said first end and toward said second end of said cylinder; and
      4. a piston rod integral with said piston and extending outwardly of said cylinder through at least one end closure plate;
  f. an operational link between said piston rod and said throttle connected to decrease the output of said pump as said piston and piston rod move in direction toward said first end of said throttle control cylinder and to increase the output of said pump as said piston and rod move in direction toward said second end of the cylinder;
  g. an accumulator including a diaphragm separating and defining a first upper accumulator chamber and a second lower accumulator chamber;
  h. means for charging gas into said upper accumulator chamber;
  i. means operable to define a first passageway from said second lower accumulator chamber and into said first end chamber;
  j. means operable to define a second passageway from said pump delivery port into said second end chamber; and
  k. independent means to selectively move said throttle control cylinder longitudinally to position it in any one of a plurality of positions with respect to said base;
  l. said means operable to define said first and second passageways including:
      1. a directional control valve including a valve body provided with a longitudinally extending cylindrical bore therethrough;
      2. a valve spool mounted to move between first and second positions in said directional control valve bore;
      3. means defining a first directional control valve passageway from a first end of said control valve body to said pump delivery port;
      4. said valve spool having parallel, spaced apart transverse first and second cross holes located intermediate first and second ends of said spool and each open to outside of the spool;
      5. said spool having a first axial bore extending through a first end of the spool adjacent said first end of said control valve and open to said first cross hole, and said spool also having a second axial bore extending through a second end of the spool adjacent a second end of said control valve, open to said second cross hole and isolated from said first cross hole and first bore;
      6. means movable with said valve spool for providing a passageway between a lower portion of said accumulator and the second axial bore at the second end of the spool;
      7. means biasing said spool toward said first position, said biasing means being of a strength to be overcome to allow said valve spool to move from said first position to said second position responsive to at least a predetermined pressure from said pump delivery port in said first directional control valve passageway;
      8. said directional control valve body being provided with a second control valve passageway open to said first cross hole of said valve spool when said spool is in first position, open to said second cross hole when said spool is in said second position and open to means providing a passageway to said first end chamber of said throttle control cylinder; and
      9. said directional control valve body being provided with a third control valve passageway open to said second cross hole of said valve spool when said spool is in its first position, open to said first cross hole when said spool is in its second position and open to means providing a passageway to said second end chamber of said throttle control valve.

5. The combination of claim 4; a by-pass line open between said first and second end chambers of said throttle control cylinder; and a by-pass shut off valve in said by-pass line operative to selectively maintain said by-pass line open during start up and closed during automatic pressure control operation.

* * * * *